(12) United States Patent
Bohm et al.

(10) Patent No.: US 6,388,567 B1
(45) Date of Patent: May 14, 2002

(54) COMBINATION MONITORING DEVICE AND PATCH FOR A PNEUMATIC TIRE AND METHOD OF INSTALLING THE SAME

(75) Inventors: Georg G. A. Bohm, Akron; John D. Rensel, Tallmadge; Russell W. Koch, Hartville; John L. Turner, Akron, all of OH (US); Robert J. Trew, Arlington, VA (US)

(73) Assignee: Bridgestone/Firestone North American Tire, LLC, Nashville, TN (US)

( * ) Notice: Subject to any disclaimer, the term of this patent is extended or adjusted under 35 U.S.C. 154(b) by 0 days.

(21) Appl. No.: 09/301,781

(22) Filed: Apr. 29, 1999

(51) Int. Cl.[7] ................................................. H04B 3/36
(52) U.S. Cl. ...................... 340/442; 340/445; 73/146.2; 73/146.4; 73/146.8; 152/152.1
(58) Field of Search .............................. 73/146.2, 146.4, 73/146.8; 152/152.1; 340/442, 445

(56) References Cited

U.S. PATENT DOCUMENTS

| | | | |
|---|---|---|---|
| 3,806,869 A | 4/1974 | Davis, Jr. ..................... 340/58 |
| 4,010,354 A | 3/1977 | Apicella, Jr. et al. ... 235/61.6 R |
| 4,067,235 A | 1/1978 | Markland et al. .......... 73/146.5 |
| 4,137,520 A | 1/1979 | Deveau ........................ 340/58 |
| 4,160,234 A | 7/1979 | Karbo et al. .................. 340/58 |
| 4,237,728 A | 12/1980 | Betts et al. ................. 73/146.5 |
| 4,311,985 A | 1/1982 | Gee et al. ...................... 340/58 |
| 4,334,215 A | 6/1982 | Frazier et al. ............... 340/539 |
| 4,494,106 A | 1/1985 | Smith et al. ................... 340/58 |
| 4,570,152 A | 2/1986 | Melton et al. ................. 340/58 |
| 4,578,992 A | 4/1986 | Galasko et al. ............. 73/146.5 |
| 4,588,978 A | 5/1986 | Allen ........................... 340/58 |
| 4,609,905 A | 9/1986 | Uzzo ............................ 340/58 |
| 4,695,823 A | 9/1987 | Vernon ........................ 340/58 |
| 4,717,905 A | 1/1988 | Morrison, Jr. et al. ........ 340/58 |
| 4,816,839 A | 3/1989 | Landt .......................... 343/795 |
| 4,845,649 A | 7/1989 | Eckardt et al. ........ 364/571.02 |
| 4,862,486 A | 8/1989 | Wing et al. .................... 377/16 |
| 4,911,217 A | 3/1990 | Dunn et al. ............... 152/152.1 |
| 5,181,975 A | 1/1993 | Pollack et al. ........... 152/152.1 |
| 5,218,861 A | 6/1993 | Brown et al. .............. 73/146.5 |
| 5,231,872 A | 8/1993 | Bowler et al. ............. 73/146.5 |
| 5,235,850 A | 8/1993 | Schurmann ................ 73/146.5 |
| 5,285,189 A | 2/1994 | Nowicki et al. ............. 340/447 |

(List continued on next page.)

OTHER PUBLICATIONS

Tigris: A Vehicle Tracking System using Passive Radio Transponders, IEEE, 1993.
Antenna Polarization Considerations, Nov. 1998 edition of Wireless Design & Development.

*Primary Examiner*—Daryl Pope
(74) *Attorney, Agent, or Firm*—Thomas R. Kingsbury; Fred H. Zollinger, III; John H. Hornickel

(57) ABSTRACT

A monitoring device and patch combination used to monitor the conditions of a pneumatic tire having an innerliner includes a monitoring device and patch. The monitoring device includes a first connection element that is connected to the monitoring device. The patch includes an antenna that is connected to a second connection element. In one embodiment of the invention, the first connection element is in the form of a socket while the second connection element is in the form of a plug. The connection elements allow the monitoring device and patch to be separately fabricated and the direct physical connection between the antenna and the monitoring device to be formed when the combination is connected to the innerliner of the tire. In another embodiment, a plug extends from the bottom of an encapsulated monitoring device and is aligned with a socket on the patch. The connection between the plug and the socket occurs automatically when the encapsulated monitoring device is aligned with and connected to the patch.

55 Claims, 6 Drawing Sheets

U.S. PATENT DOCUMENTS

| | | | |
|---|---|---|---|
| 5,319,354 A | 6/1994 | Myatt | 340/572 |
| 5,348,067 A | 9/1994 | Myatt | 152/152.1 |
| 5,413,159 A | 5/1995 | Olney et al. | 152/418 |
| 5,483,826 A | 1/1996 | Schultz et al. | 73/146.5 |
| 5,483,827 A * | 1/1996 | Kulka et al. | 73/146.5 |
| 5,500,065 A | 3/1996 | Koch et al. | 156/123 |
| 5,559,484 A | 9/1996 | Nowicki et al. | 340/447 |
| 5,562,787 A | 10/1996 | Koch et al. | 156/64 |
| 5,573,610 A | 11/1996 | Koch et al. | 152/152.1 |
| 5,573,611 A | 11/1996 | Koch et al. | 152/152.1 |
| 5,600,301 A | 2/1997 | Robinson, III | 340/442 |
| 5,731,754 A | 3/1998 | Lee, Jr. et al. | 340/447 |
| 5,971,046 A * | 10/1999 | Koch et al. | 152/152.1 |

* cited by examiner

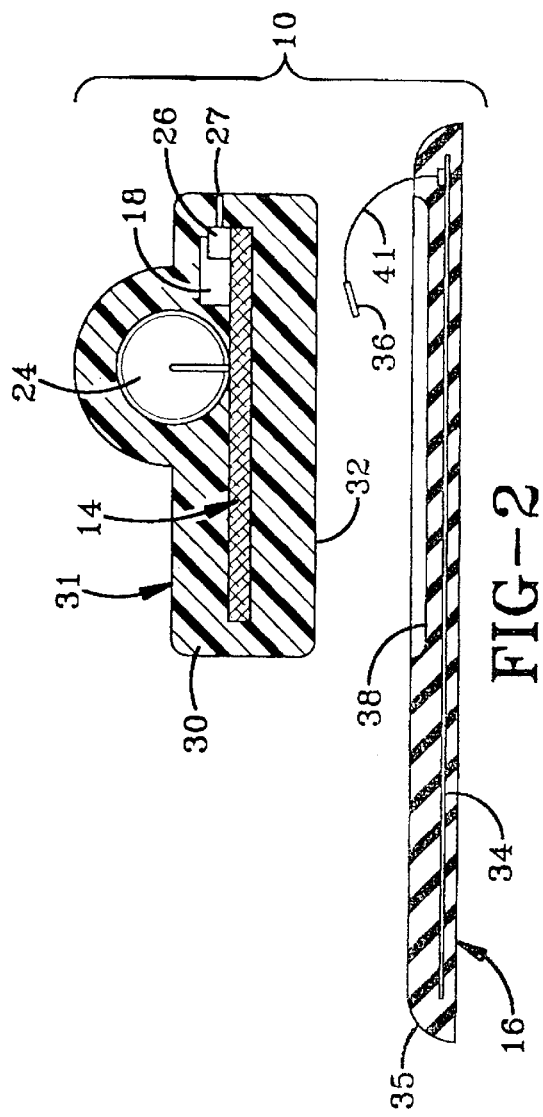
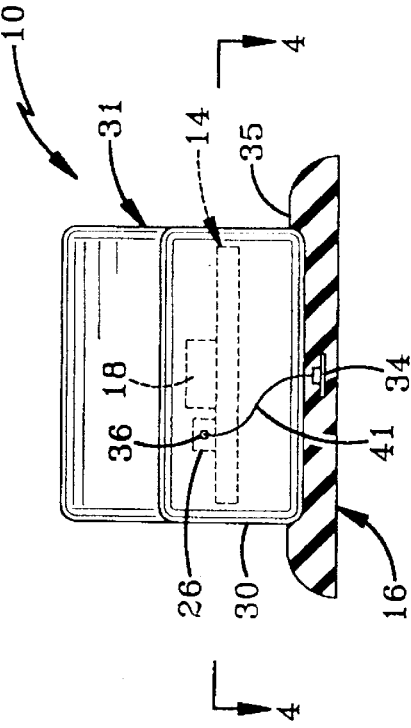
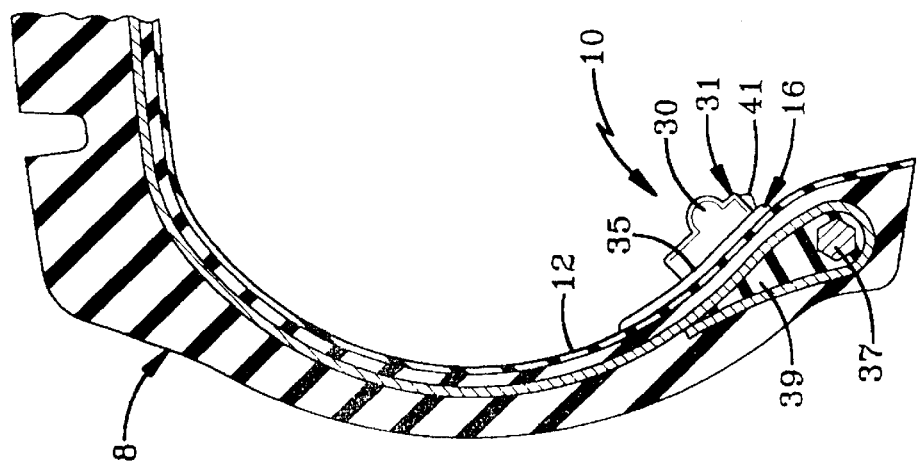

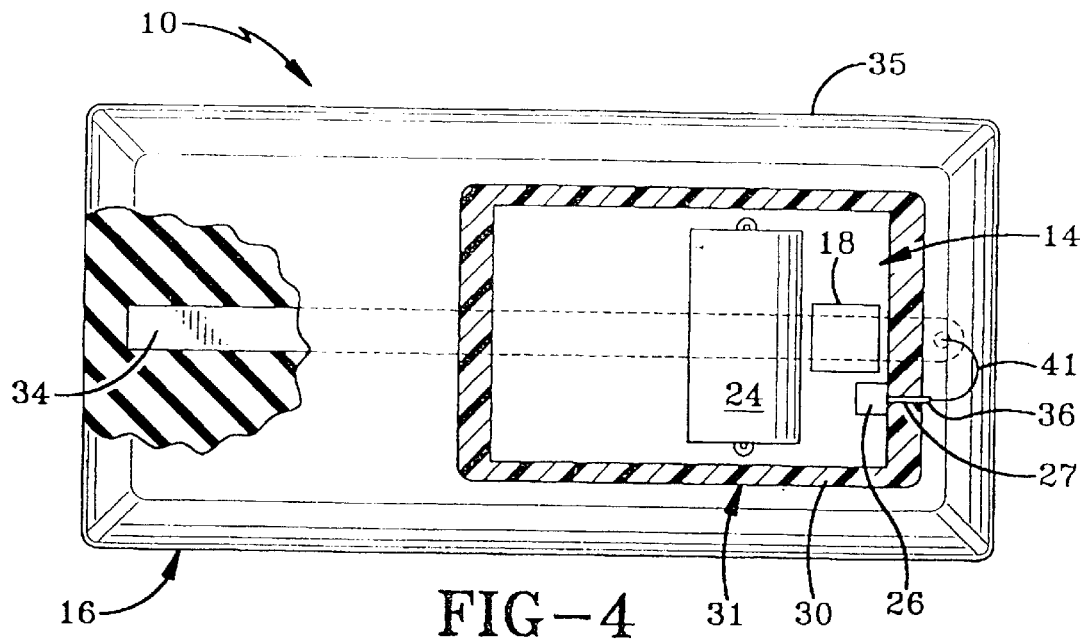
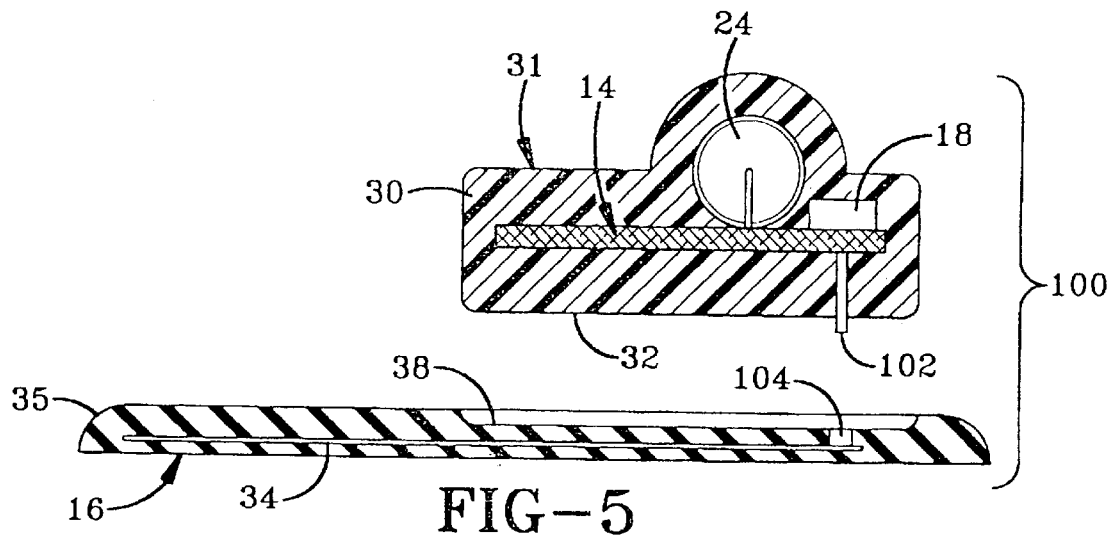
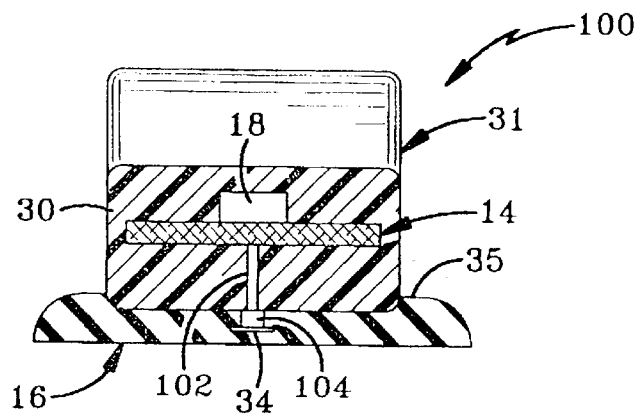

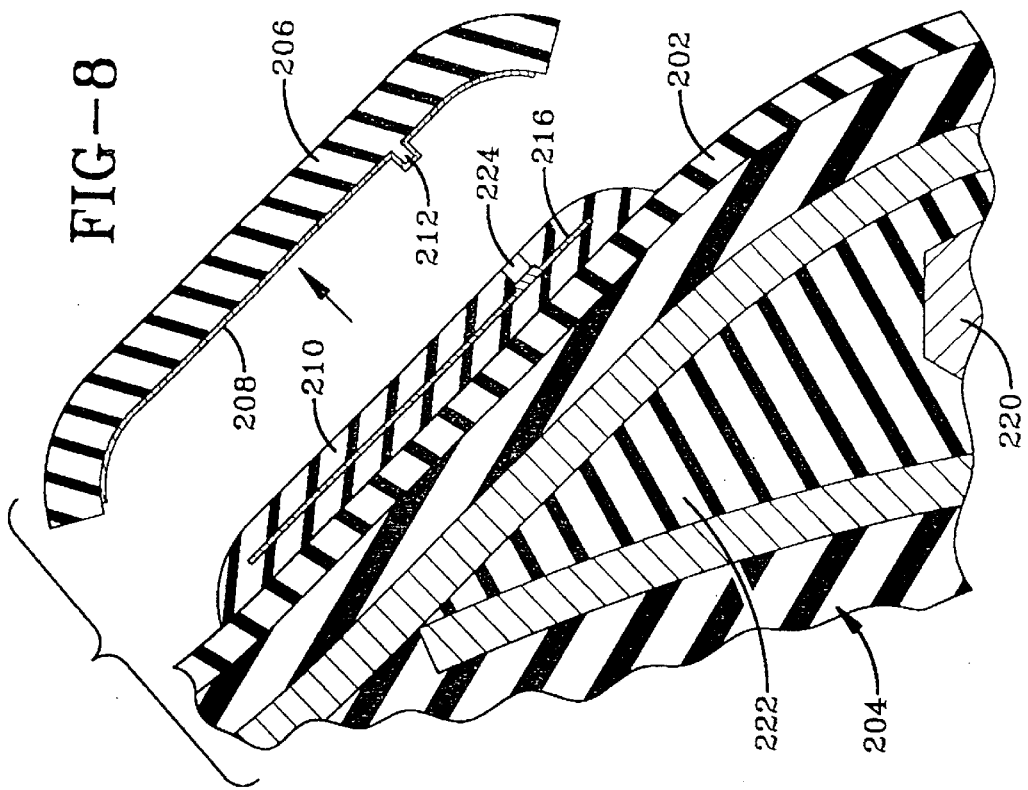
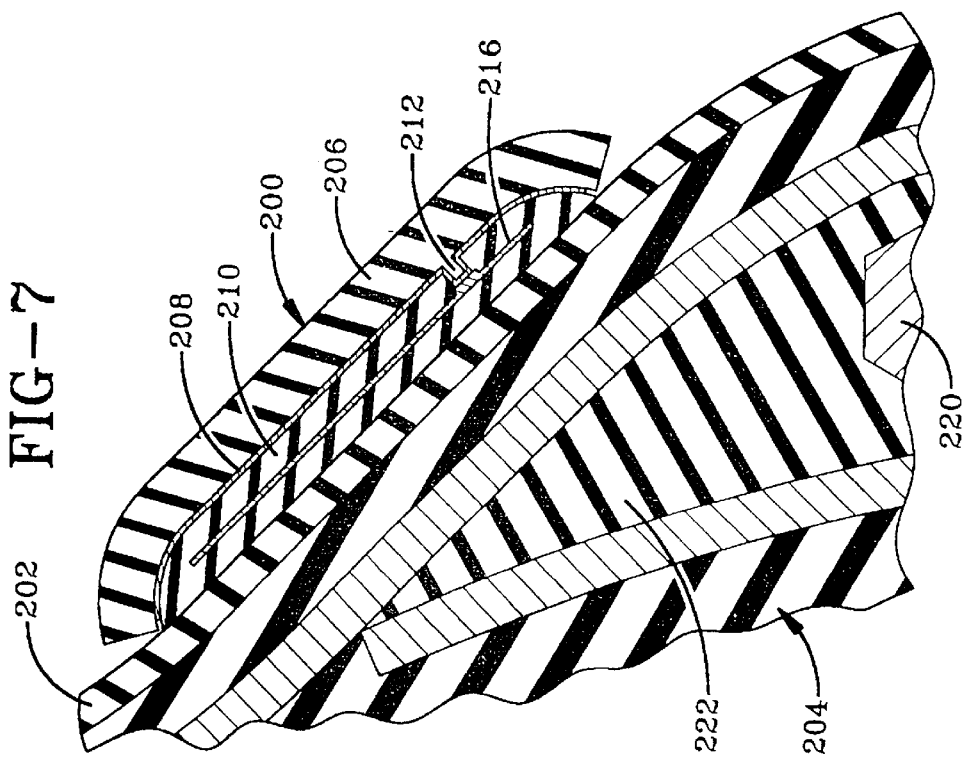

COMBINATION MONITORING DEVICE AND PATCH FOR A PNEUMATIC TIRE AND METHOD OF INSTALLING THE SAME

BACKGROUND OF THE INVENTION

1. Technical Field

The present invention generally relates to monitoring devices used to monitor at least one engineering condition of a pneumatic tire and, more particularly, to a monitoring device and patch combination where the antenna of the monitoring device is disposed in the patch. Specifically, the present invention relates to an encapsulated monitoring device and a patch for attaching the encapsulated monitoring device to the innerliner of a pneumatic tire with the antenna of the monitoring device being disposed in the patch and including a connector that allows the user to selectively connect the antenna to the monitoring device.

2. Background Information

It is often desired in the art to monitor an engineering condition of a tire while the tire is installed and in use on a vehicle. Typical desirable measurements are the number of tire rotations, the internal temperature of the tire, and the internal pressure of the tire. These measurements are preferably taken while the tire is in use on the vehicle without having to remove the tire from the vehicle or specifically position the tire to take the measurement.

Numerous types of monitoring devices are known in the art to perform these measurements. One type of monitoring device uses a passive integrated circuit embedded within the body of the tire that is activated by a radio frequency transmission that energizes the circuit by inductive magnetic coupling. Other prior art devices used for monitoring tire conditions include self-powered circuits that are positioned external of the tire, such as at the valve stem. Other active self-powered programmable electronic devices are disclosed in U.S. Pat. Nos. 5,573,610, 5,562,787, and 5,573,611 which are assigned to the assignee of the present application.

Each of the active self-powered programmable electronic devices includes an antenna that is used to transmit the information gathered by the monitoring device to an information gathering device positioned outside of the tire. One of the problems in the art is to position the antenna such that the information gathered by the monitoring device is accurately transmitted to the information gathering device outside of the tire. It is desired to position the antenna against the sidewall of the pneumatic tire so that the transmission waves pass directly into the sidewall. In the past, the antenna of the monitoring device generally extended into the interior chamber of the tire such that the transmission waves had to pass first through the air inside the tire, through the innerliner, through the tire sidewall, and then through the air to the information gathering device. It is desired in the art to provide an antenna for an active, self-powered programmable electronic device that is positioned so that the transmission waves do not have to first pass through the inner chamber of the tire before entering the tire sidewall.

The bead ring and apex filler of the tire tend to interfere with the transmission from the monitoring device. It is thus desired in the art to position the antenna away from the bead ring and apex filler so that the transmission through the tire sidewall is as strong as possible. On the other hand, it is also desirable to position the monitoring device as close to the bead ring as possible because that area of the tire sidewall is a low flex area that stretches less than the middle portion of the tire sidewall. It is thus desired in the art to provide a method for attaching an antenna and a monitoring device that accommodates the desired position for both elements.

The monitoring devices known in the art are typically encapsulated with an encapsulation material that provides structural support to the monitoring device so that the device is not destroyed by the forces normally encountered and experienced by a pneumatic tire. In some situations, the process of encapsulation must take into account that the antenna must extend from the encapsulated monitoring device. It is desired to provide a monitoring device configuration that eliminates this encapsulation problem by positioning the antenna apart from the monitoring device.

One method of connecting the monitoring device to the innerliner of a tire includes the use of a rubber attachment patch to carry the monitoring device with the inner surface of the rubber attachment patch being configured to securely adhere to the innerliner of a tire. It is desired that the sensitive electronic monitoring device and the rubber patch be capable of being manufactured in separate locations and assembled when the monitoring device is attached to the innerliner of a tire. Separating the rubber attachment patch and the sensitive monitoring device also allows the rubber attachment patch to be aggressively attached to the innerliner of a tire without the risk of damaging the sensitive monitoring device. After the rubber attachment patch is securely anchored to the innerliner, the monitoring device may be attached to the patch.

SUMMARY OF THE INVENTION

In view of the foregoing, it is an objective of the present invention to provide a monitoring device and patch combination that may be fabricated at separate manufacturing facilities and then connected together when the monitoring device is installed in a pneumatic tire.

Another objective of the present invention is to provide a monitoring device and patch combination wherein the antenna for the monitoring device is carried by the patch.

A further objective of the present invention is to provide a monitoring device and patch combination that positions the antenna in a manner that causes the transmission waves to pass directly into the tire sidewall away from the bead ring and apex filler of the tire.

Another objective of the present invention is to provide a monitoring device and patch combination that allows the antenna to be ideally positioned away from the bead ring while allowing the monitoring device to be positioned closer to the bead ring.

Another objective of the present invention is to provide a monitoring device and patch combination that has a connector that allows the user to form the connection between the antenna and the monitoring device after the individual elements have been fabricated.

A further objective of the present invention is to provide a monitoring device and patch combination that automatically forms the connection between the antenna and the monitoring device when the monitoring device is aligned and connected with the patch.

Another objective of the present invention is to provide a method for installing a monitoring device on the innerliner of a tire that allows the patch of the combination to be connected prior to the monitoring device and aggressively stitched to the innerliner without the danger of damaging the monitoring device.

Another objective of the present invention is to provide a monitoring device and patch combination that automatically forms the connection between an antenna embedded within an anchoring patch adhered to the innerliner of a tire when the monitoring device and patch combination is adhered to the anchoring patch.

Another objective of the present invention is to provide a method and combination that are of simple construction, that achieve the stated objectives in a simple, effective, and inexpensive manner, that solve the problems, and that satisfy the needs existing in the art.

These and other objectives and advantages of the present invention are obtained by a monitoring device and patch combination used to monitor the conditions of a pneumatic tire having an innerliner, the combination including a monitoring device; a patch selectively carrying the monitoring device, the patch adapted to mount the monitoring device on the innerliner of the pneumatic tire; an antenna carried by the patch; and a connector selectively physically electrically connecting the antenna to the monitoring device.

Other objectives and advantages of the invention are obtained by a method of installing a monitoring device on the innerliner of a tire including the steps of providing a monitoring device having a first connection element; providing a patch separate from the monitoring device, the patch having an antenna connected to a second connection element; attaching the monitoring device to the patch; and connecting the first and second connection elements to create a connection between the antenna and the monitoring device; and mounting the patch on the innerliner.

BRIEF DESCRIPTION OF THE DRAWINGS

The preferred embodiments of the invention, illustrative of the beat mode in which the applicants contemplate applying the principles of the invention, are set forth in the following description and are shown in the drawings and are particularly and distinctly pointed out and set forth in the appended claims.

FIG. 1 is a partial sectional view of a pneumatic tire with the monitoring device and patch combination connected to the innerliner of the pneumatic tire;

FIG. 2 is a sectional side view of a first embodiment of the monitoring device and patch combination of the present invention;

FIG. 3 is a sectional end view of the monitoring device and patch combination showing the arrangement of the foot portion of the patch with respect to the encapsulated monitoring device;

FIG. 4 is a sectional view taken along line 4—4, FIG. 3;

FIG. 5 is a sectional side view of a second embodiment of the monitoring device and patch combination of the present invention;

FIG. 6 is a sectional end view of the second embodiment of the monitoring device and patch combination;

FIG. 7 is a partial sectional view of a pneumatic tire with an anchoring patch having an antenna secured to the innerliner of the tire;

FIG. 8 is a view similar to FIG. 7 with a portion of the anchoring patch being removed to provide an alignment hole that provides access to the antenna.

Similar numerals refer to similar parts throughout the drawings.

DESCRIPTION OF THE PREFERRED EMBODIMENTS

Figure 9:
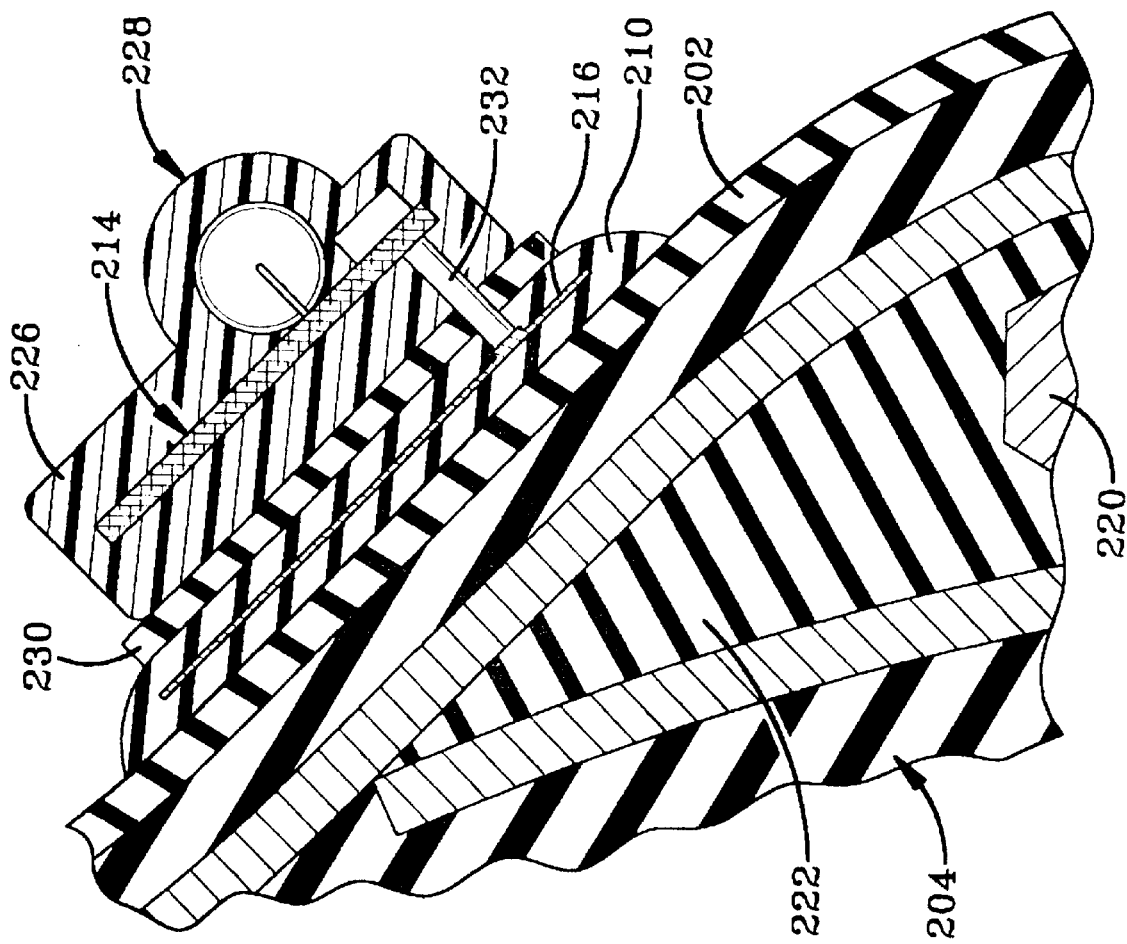
FIG. 9 is a sectional view similar to FIGS. 7 and 8 showing the attachment of an encapsulated monitoring device and patch combination to the anchoring patch whereby a physical electrical connection is provided between the antenna and an electronic monitoring device disposed within the encapsulated monitoring device.

The first embodiment of the monitoring device and patch combination of the present invention is depicted in FIGS. 1–4 and is indicated generally by the numeral 10. Combination 10 is connected to an innerliner 12 of a pneumatic tire 8 in FIG. 1. Combination 10 preferably is connected to innerliner 12 by an attachment or connector that is known in the art, such as a suitable adhesive.

Combination 10 includes a monitoring device 14 and a patch 16 that are fabricated separately. Monitoring device 14 includes at least one sensing element 18 and may include a plurality of sensing elements that gather information about at least one engineering condition of pneumatic tire 8. Monitoring device 14 further includes a power source such as a battery 24 that powers monitoring device 14. Examples of monitoring devices are shown in U.S. Pat. Nos. 5,573,610 and 5,500,065, the contents of which are incorporated herein by reference.

Monitoring device 14 is connected to a first connection element 26 that is in the form of a socket in the first embodiment of the present invention. Monitoring device 14 and first connection element or socket 26 are preferably encapsulated by an encapsulation material 30 that serves to protect monitoring device 14 and forms an encapsulated monitoring device 31. Encapsulation material 30 may be a suitable epoxy or plastic that provides a rigid structure around monitoring device 14 and socket 26. An opening 27 (FIG. 4) through encapsulation material 30 provides access to socket 26 from the outside of the encapsulated monitoring device 31. Encapsulated monitoring device 31 includes a bottom surface 32 that provides a mounting surface for device 31.

Patch 16 (FIG. 2) includes an antenna 34 embedded within the body of the patch. Antenna 34 may be any of a variety of shapes including a wire, plate, rod, etc. A second connection element 38 is connected to antenna 34. In the first embodiment of the present invention, second connection element 36 is in the form of a plug that is connected to antenna 34 by a flexible wire 41. Patch 16 may be formed from a suitable rubber that is compatible with and provides desirable adhesion properties with respect to innerliner 12. Patch 16 has a recessed top surface 38 sized and adapted to receive encapsulated monitoring device 31 such that bottom surface 32 lies against top surface 38 when device 31 is connected to patch 16. Patch 16 also includes a foot portion 35 (FIG. 4) that extends away from top portion 38 where encapsulated monitoring device 31 is seated. Antenna 34 is disposed within foot portion 35 so that it may extend away from monitoring device 14. This relative location allows antenna 34 to be positioned away from the bead ring 37 and apex filler 39 of tire 8 when combination 10 is attached to innerliner 12 (FIG. 1). The space between antenna 34 and monitoring device 14 allows combination 10 to be ideally positioned on innerliner 12 with monitoring device 14 positioned close to bead ring 37 and antenna 34 positioned away from bead ring 37.

In accordance with one of the objectives of the present invention, socket 26 is configured and adapted to receive plug 36 to form a direct physical electrical connection between antenna 34 and monitoring device 14. The connection between antenna 34 and monitoring device 14 may thus be selectively created by selectively placing plug 36 into socket 26. A direct physical electrical connection between antenna 34 and monitoring device 14 is achieved when plug 36 is received in socket 26.

Monitoring device 14 and pad 16 may be connected to innerliner 12 in the following manner. First, monitoring device 14 is provided with socket 26. Monitoring device 14 is then encapsulated with encapsulation material 30 to entirely encapsulate monitoring device 14 and to partially encapsulate socket 26. Patch 16 is then fabricated with antenna 34 embedded within foot portion 35. Antenna 34 is connected to plug 36 by a flexible wire 41 that extends outside of patch 16. The steps of fabricating encapsulated monitoring device 31 and patch 16 may be performed at separate manufacturing locations because no physical connection between antenna 34 and monitoring device 14 is required during the fabrication steps.

An area of innerliner 12 of pneumatic tire 8 is then selected where combination 10 is to be installed. It is desirable to install combination 10 such that monitoring device 14 is adjacent bead ring 37 while foot portion 35 of patch 16 having antenna 34 extends away from bead ring 37. Patch 16 may be connected to innerliner 12 by a suitable adhesive or by other attachment methods known in the art. One attachment example would be a thermoplastic or thermoset adhesive that may require some heat to properly function. Patch 16 may be aggressively stitched to innerliner 12 without the danger of damaging monitoring device 14 because monitoring device 14 may be attached to patch 16 after patch 16 is connected to innerliner 12.

Encapsulated monitoring device 31 then may be connected to patch 16 by seating bottom surface 32 of encapsulated monitoring device 31 onto top surface 38 of patch 16. A suitable manner of connecting the two elements is used such as a suitable adhesive. The direct physical electrical connection between antenna 34 and monitoring device 14 is then created by connecting plug 36 with socket 26. This connection creates a direct electrical connection between antenna 34 and monitoring device 14.

In another installation method, encapsulated monitoring device 31 is first mounted on patch 16 and secured thereto with a suitable adhesive. The direct electrical connection is made between antenna 34 and monitoring device 14 before patch 16 is mounted on innerliner 12. Patch 16 carrying encapsulated monitoring device 31 is then mounted on innerliner 12 with a suitable adhesive.

A second embodiment of the invention is depicted in FIGS. 5 and 6 and is indicated generally by the numeral 100. Combination 100 includes many of the same elements and configurations as combination 10 discussed above and thus similar numerals are used to identify similar parts between the two embodiments. Second embodiment of combination 100 also includes monitoring device 14 that is encapsulated with encapsulation material 30 to form encapsulated monitoring device 31. The first connection element 102 of combination 100 is in the form of a plug that is connected to monitoring device 14 and extends out from encapsulated monitoring device 31. Plug 102 extends substantially rigidly away from bottom surface 32 of encapsulated monitoring device 31. The second connection element of combination 100 is in the form of a socket 104 disposed on top surface 38 of patch 16. Socket 104 is aligned with plug 102 such that plug 102 docks with socket 104 when encapsulated monitoring device 31 is seated on patch 16 as shown in FIG. 6.

The alignment of plug 102 and socket 104 allows the direct physical electrical connection between antenna 34 and monitoring device 14 to be automatically made when encapsulated monitoring device 31 is aligned and seated on patch 16.

Combination 100 may be installed on pneumatic tire 8 in the following manner. First, patch 16 is connected to innerliner 12 by suitable adhesive or by other suitable methods known in the art. Patch 16 may be aggressively stitched to innerliner 12 without the danger of damaging monitoring device 14 because monitoring device 14 is not yet attached to patch 16. Once patch 16 is securely attached to innerliner 12, encapsulated monitoring device 31 is aligned with patch 12 such that plug 102 is aligned with socket 104. Encapsulated monitoring device 31 is then seated on top surface 38 of patch 16 and secured thereto by a suitable adhesive. When this occurs, plug 102 docks with socket 104 and automatically provides the direct physical electrical connection between antenna 34 and monitoring device 14.

Combination 100 may also be installed by first mounting patch 16 on innerliner 12. Encapsulated monitoring device 31 is then mounted on patch 16 to automatically form the direct electrical connection when plug 102 is received in socket 104.

Another embodiment of the present invention is described with reference to FIGS. 7–9. In this embodiment, an anchoring patch 200 is adhered to the innerliner 202 of a pneumatic tire 204. Anchoring patch 200 may be adhered to innerliner 202 during the curing process of a green tire or may be otherwise adhered to innerliner 202 by a suitable adhesive. Anchoring patch 200 includes a protective cover 206 preferably formed from a cured rubber. Cover 206 may be reinforced with a plurality of cords. A layer of cure material 208, such as cure paper or cure cloth, is disposed adjacent cover 206 and prevents cover 206 and an anchoring layer 210 from curing together. Anchoring layer 210 may be initially formed of an uncured rubber that is initially stitched to innerliner 202 and then cured to innerliner 202 during the curing process of the green tire. Anchoring layer 210 may also be a layer of cured rubber that is adhered to innerliner 202 by a suitable adhesive. A description of at least one type of anchoring patch 200 and a method for using the patch are described in U.S. patent applications Ser. Nos. 09/206,273 and 09/205,931, filed Dec. 4, 1998.

In accordance with the objectives of the present invention, cover 206 includes a plug 212 that extends through cure material 208 and into the body of anchoring layer 210. Additional plugs 212 may be provided depending on the desired number of connections between an electronic monitoring device 214 and an antenna 216. Each plug 212 is fabricated from a material or coated with a material that will not adhere to anchoring layer 210 to a degree where plug 212 cannot be removed. In accordance with another objective of the invention, antenna 216 is embedded within anchoring layer 210 and may be any suitable antenna such as an elongated plate or a wire fabricated from a conductive material. The position of antenna 216 allows monitoring device 214 to be fabricated separately from anchoring patch 200.

In this embodiment of the present invention, anchoring patch 200 is located on innerliner 202 to ideally position antenna 216 away from bead ring 220 and apex filler 222. This location allows antenna 216 to extend away from bead ring 220 and apex filler 222 so that the communication between antenna 216 and a data gathering device (not shown) that is positioned outside tire 204 is not interfered with.

When electronic monitoring device 214 is mounted on tire 204, cover 206 and cure material 208 are removed from anchoring layer 210 as shown in FIG. 8. The removal of cover 208 also removes plug 212 which leaves an alignment hole 224 in anchoring layer 210 that extends to antenna 216. Alignment hole 224 allows electronic monitoring device 214 to be located with respect to antenna 216.

Electronic monitoring device 214 is typically encapsulated with an encapsulation material 226 to form an encapsulated monitoring device 228. Encapsulated monitoring device 228 is connected to an attachment patch 230 by an appropriate adhesive. As shown in FIG. 9, a connector such as a prong 232 extends from electronic monitoring device 214, through encapsulation material 226, through attachment patch 230, and extends beyond attachment patch 230 a distance sufficient to fill alignment hole 224 and contact antenna 216 when attachment patch 230 and encapsulated monitoring device 228 are connected to anchoring layer 210. When attachment patch 230 and encapsulated monitoring device 228 are attached to anchoring layer 210, prong 232 contacts antenna 216 to provide a direct physical electrical connection between electronic monitoring device 214 and antenna 216. The attachment between attachment patch 230 and anchoring layer 210 may be by an adhesive or by curing attachment patch 230 to anchoring layer 210 by heat or a chemical curing process.

In other embodiments of the invention, attachment patch 230 is adhered to anchoring layer 210 before encapsulated monitoring device 228 is attached to attachment patch 230. In still other embodiments, alignment hole 224 is not formed and connector 232 simply pierces attachment patch 230 and anchoring layer 210 to form the direct physical electrical connection between antenna 216 and monitoring device 214. Connector 232 may also extend out of anchoring layer 210 to be received by monitoring device 214 as explained above with respect to FIGS. 1–3.

Figure 10:
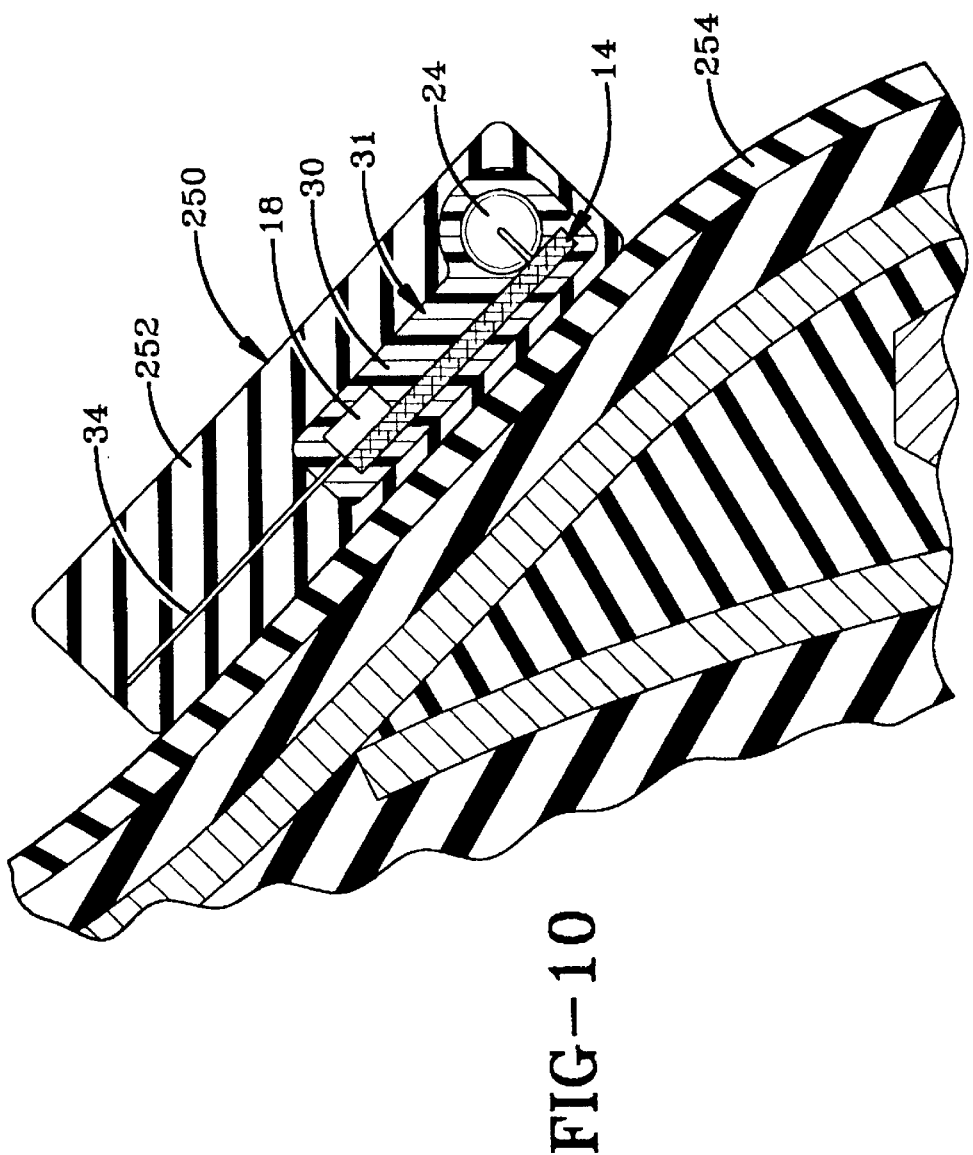
FIG. 10 is a sectional view of a monitoring device and antenna embedded within a patch connected directly to the innerliner.

Another embodiment of the invention is depicted in FIG. 10 and is indicated generally by the numeral 250. In this embodiment, encapsulated monitoring device 31 and antenna 34 are embedded within an attachment patch 252. Attachment patch 252 is then connected to the innerliner 254 of the pneumatic tire by an appropriate connector such as an adhesive. The location of antenna 34 within patch 252 improves the transmission wave propagation from antenna 34 through the sidewall of the pneumatic tire. The location of antenna 34 and encapsulated monitoring device 31 also prevents antenna 34 or encapsulated monitoring device 31 from being damaged because they cannot move inside of the pneumatic tire.

Figure 11:
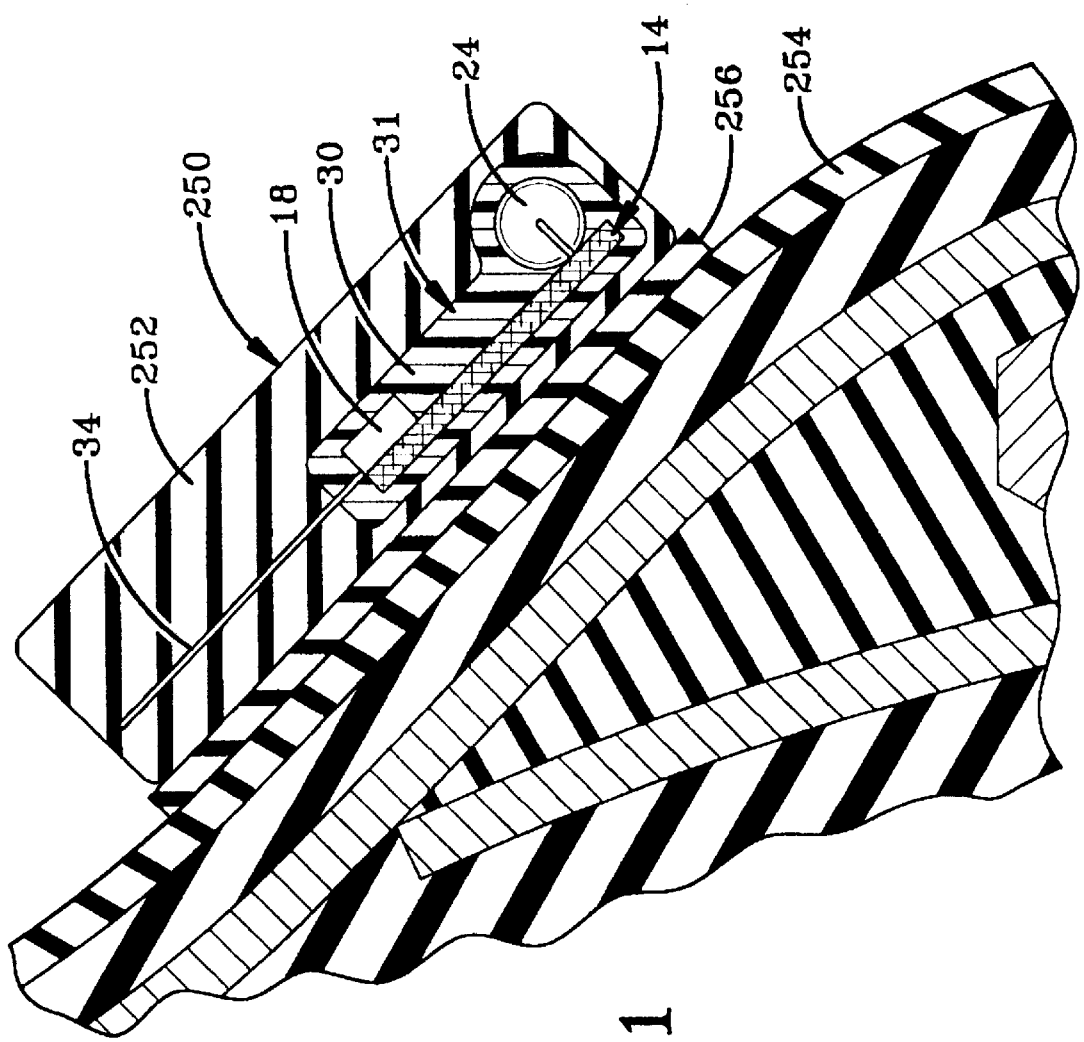
FIG. 11 is a view similar to FIG. 10 with the patch connected to the innerliner with an anchoring layer of an anchoring patch.

An alternative method of mounting monitoring device and antenna combination 250 to innerliner 254 is depicted in FIG. 11. In this embodiment, an anchoring layer 256 substantially similar to anchoring layer 210 described above is used to mount patch 252 to innerliner 254.

Accordingly, the improved monitoring device and patch combination is simplified, provides an effective, safe, inexpensive, and efficient device that achieves all the enumerated objectives of the invention, provides for eliminating difficulties encountered with prior devices, and solves problems and obtains new results in the art.

In the foregoing description, certain terms have been used for brevity, clearness, and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the monitoring device and patch combination is constructed and used, the characteristics of the construction, and the advantageous new and useful results obtained, the new and useful structures, devices, elements, arrangements, parts, combinations, and methods are set forth in the appended claims.

What is claimed is:

1. A monitoring device and patch combination used to monitor the conditions of a pneumatic tire having an innerliner, the combination comprising:
   a monitoring device;
   a patch carrying said monitoring device, said patch adapted to mount the monitoring device on the innerliner of the pneumatic tire;
   an antenna carried by said patch; and
   a connector selectively physically electrically connecting said antenna to said monitoring device.

2. The combination of claim 1, wherein said antenna is embedded within said patch.

3. The combination of claim 1, wherein said connector includes at least one plug and at least one socket.

4. The combination of claim 3, wherein said monitoring device is encapsulated by an encapsulation material to form an encapsulated monitoring device; said encapsulated monitoring device having a bottom surface.

5. The combination of claim 4, wherein said plug extends out from said encapsulated monitoring device; said socket being carried by said patch and aligned with said plug whereby said plug docks with said socket when said monitoring device is aligned with and mounted on said patch.

6. The combination of claim 5, wherein said plug substantially rigidly extends out from said bottom surface of said encapsulated monitoring device.

7. The combination of claim 3, wherein said plug extends from said patch and said socket is connected to said monitoring device.

8. The combination of claim 7, wherein said plug flexibly extends from said patch.

9. The combination of claim 8, further comprising a flexible wire connecting said antenna to said plug.

10. The combination of claim 9, wherein said antenna is embedded within said patch.

11. The combination of claim 10, wherein said monitoring device is encapsulated by an encapsulation material to form an encapsulated monitoring device.

12. The combination of claim 1, wherein said patch includes a foot portion that extends away from said monitoring device, said antenna carried by said patch at said foot portion.

13. A method of installing a monitoring device on the innerliner of a tire comprising the steps of:
   providing a monitoring device having a first connection element;
   providing a patch separate from the monitoring device, the patch having an antenna connected to a second connection element;
   attaching the monitoring device to the patch;
   connecting the first and second connection elements to create a physical electrical connection between the antenna and the monitoring device; and
   mounting the patch on the innerliner.

14. The method of claim 13, wherein the step of providing a monitoring device includes the step of encapsulating the monitoring device and at least a portion of the first connection element with an encapsulation material.

15. The method of claim 13, wherein the step of providing a patch includes the step of embedding the antenna and at least a part of the second connection element within the patch.

16. The method of claim 13, wherein the step of connecting the first and second connection elements occurs as the monitoring device is attached to the patch.

17. The method of claim 13, wherein the step of connecting the first and second connection elements occurs after the monitoring device is attached to the patch.

18. The method of claim 17, wherein the step of mounting the patch on the innerliner occurs before the step of attaching the monitoring device to the patch.

19. The method of claim 18, further comprising the step of stitching the patch to the innerliner of the tire prior to the step of attaching the monitoring device to the patch.

20. The method of claim 13, wherein the step of connecting the first and second connection elements occurs before the monitoring device is attached to the patch.

21. The method of claim 13, wherein the step of mounting the patch on the innerliner occurs before the step of attaching the monitoring device to the patch.

22. The method of claim 13, wherein the step of mounting the patch on the innerliner occurs after the step of attaching the monitoring device to the patch.

23. A monitoring device and patch combination used to monitor the conditions of a pneumatic tire having an innerliner, the combination comprising:
a monitoring device;
an attachment patch connected to said monitoring device;
an anchoring layer adapted to be connected to the innerliner of the tire;
an antenna carried by said anchoring layer; and
a connector connected to said monitoring device and contacting said antenna to provide a direct physical electrical connection between the antenna and the monitoring device.

24. The combination of claim 23, wherein said monitoring device is encapsulated by an encapsulation material to form an encapsulated monitoring device; said connector extending through said encapsulation material.

25. The combination of claim 23, wherein said antenna is embedded within said anchoring layer.

26. The combination of claim 25, wherein the anchoring layer defines an alignment hole.

27. The combination of claim 26, wherein said connector is disposed within said alignment hole.

28. An anchoring patch for attaching a monitoring device to an innerliner of a tire, said anchoring patch comprising:
an anchoring layer adapted to be connected to the innerliner;
an antenna carried by said anchoring layer;
a cover carried on at least one side of said anchoring layer; and
a layer of cure material disposed between said anchoring layer and said cover.

29. The patch of claim 28, wherein the cover includes a plug, said plug extending into said anchoring layer adjacent said antenna.

30. The patch of claim 28, wherein said anchoring layer is fabricated from uncured rubber.

31. The patch of claim 28, wherein said cover is fabricated from a cured rubber.

32. The patch of claim 28, wherein said antenna is embedded within said anchoring layer.

33. A method of attaching a monitoring device to an innerliner of a tire, the method comprising the steps of:
providing an anchoring patch having an anchoring layer and a cover, said anchoring layer carrying an antenna;
attaching the anchoring patch to the innerliner of the tire;
removing the cover;
providing a monitoring device having a connector;
attaching the monitoring device to the anchoring layer; and
connecting the connector of the monitoring device with the antenna.

34. The method of claim 33, wherein the step of attaching the anchoring patch to the innerliner includes the step of curing the anchoring patch to the tire.

35. The method of claim 34, wherein the step of curing includes the step of chemically curing the anchoring patch to the tire.

36. The method of claim 34, wherein the step of curing includes the step of heat curing the anchoring patch to the tire.

37. The method of claim 33, wherein the step of attaching the anchoring patch to the innerliner includes the step of adhesively attaching the anchoring patch to the innerliner of the tire.

38. The method of claim 33, wherein the step of providing an anchoring patch includes the step of providing a plug connected to the cover that extends into the anchoring layer; and further including the step of forming an alignment hole in the anchoring when the cover is removed.

39. The method of claim 38, further comprising the steps of aligning the connector with the alignment hole and inserting the connector into the alignment hole.

40. The method of claim 39, further comprising the step of providing an attachment patch attached to the monitoring device and adhering the attachment patch to the anchoring layer.

41. The method of claim 40, wherein the step of adhering the attachment patch to the anchoring layer occurs before the monitoring device is attached to the anchoring layer.

42. A monitoring device and patch combination used to monitor the conditions of a pneumatic tire having an innerliner, the combination comprising:
a monitoring device having at least one sensing element;
a patch;
an antenna mounted on the patch, the patch adapted to mount on the innerliner of the tire; and
the antenna being electrically connected to the monitoring device.

43. The combination of claim 42, wherein the antenna is embedded within the patch.

44. The combination of claim 42, further comprising an attachment patch, the monitoring device mounted on the attachment patch and the attachment patch being mounted on the patch having the antenna.

45. The combination of claim 42, wherein the connection between the antenna and the monitoring device is selective.

46. The combination of claim 45 further comprising first and second connection elements; the first connection element being connected to the antenna and the second connection element being connected to the monitoring device; the first and second connection elements being selectively connectable.

47. The combination of claim 42, wherein the antenna is spaced from the monitoring device.

48. The combination of claim 42, wherein the patch includes a foot portion; at least a portion of the antenna being disposed at the foot portion of the patch.

49. The combination of claim 48, wherein a major portion of the antenna is disposed at the foot portion of the patch.

50. The combination of claim 49, further comprising a connector disposed between the antenna and the monitoring device; the connector being adapted to provide a selective connection between the antenna and the monitoring device.

51. The combination of claim 42, further comprising an attachment patch; the monitoring device being connected to the attachment patch; and the attachment patch mounted to the patch.

52. The combination of claim 42, wherein at least a portion of the antenna is embedded within the patch.

53. The combination of claim 42, wherein the monitoring device is connected to the patch.

54. The combination of claim 42, wherein the monitoring device is embedded within the patch.

55. The combination of claim 54, wherein the monitoring device is spaced from the antenna.

\* \* \* \* \*